(12) United States Patent
Pegg

(10) Patent No.: US 9,420,014 B2
(45) Date of Patent: Aug. 16, 2016

(54) SAVING STATE OF A COLLABORATIVE SESSION IN AN EDITABLE FORMAT

(75) Inventor: Nigel Pegg, San Francisco, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 872 days.

(21) Appl. No.: 11/940,635

(22) Filed: Nov. 15, 2007

(65) Prior Publication Data

US 2014/0032655 A1 Jan. 30, 2014

(51) Int. Cl.
| | |
|---|---|
| *G06F 15/16* | (2006.01) |
| *H04L 29/06* | (2006.01) |
| *G06Q 10/10* | (2012.01) |
| *H04L 12/18* | (2006.01) |

(52) U.S. Cl.
CPC ............ *H04L 65/4015* (2013.01); *G06Q 10/10* (2013.01); *H04L 12/1813* (2013.01); *H04L 12/1831* (2013.01)

(58) Field of Classification Search
USPC .......................................................... 709/204
See application file for complete search history.

(56) References Cited

U.S. PATENT DOCUMENTS

| | | | |
|---|---|---|---|
| 5,627,936 A | 5/1997 | Prasad et al. | |
| 5,892,915 A * | 4/1999 | Duso et al. ..................... | 709/219 |
| 6,321,252 B1 | 11/2001 | Bhola | |
| 6,342,906 B1 | 1/2002 | Kumar et al. | |
| 6,343,313 B1 | 1/2002 | Salesky et al. | |
| 6,357,042 B2 | 3/2002 | Srinivasan et al. | |
| 6,721,921 B1 | 4/2004 | Altman | |
| 6,898,642 B2 | 5/2005 | Chafle et al. | |
| 6,915,512 B1 | 7/2005 | Miyajima | |
| 7,085,558 B2 | 8/2006 | Berstis et al. | |
| 7,099,798 B2 | 8/2006 | Yu et al. | |
| 7,107,307 B1 * | 9/2006 | Takishita ....................... | 709/203 |
| 7,133,831 B2 | 11/2006 | Brown et al. | |
| 7,143,136 B1 * | 11/2006 | Drenan et al. ................. | 709/204 |
| 7,213,051 B2 | 5/2007 | Zhu | |
| 7,248,684 B2 | 7/2007 | Caspi et al. | |
| 7,295,752 B1 | 11/2007 | Jain et al. | |
| 7,349,944 B2 | 3/2008 | Vernon et al. | |

(Continued)

FOREIGN PATENT DOCUMENTS

| | | |
|---|---|---|
| EP | 1614288 | 11/2004 |
| JP | 2004140678 A | 5/2004 |

(Continued)

OTHER PUBLICATIONS

"ESPRE Live Features: Many-to-many video conferencing", [Online]. Retrieved from the Internet: <URL:http://www.espresolutions.com/pdf/ESPRE.pdf>, 4 pgs.

(Continued)

*Primary Examiner* — Andrew Goldberg
(74) *Attorney, Agent, or Firm* — Shook Hary & Bacon.L.L.P. Intellectual Property Dept.

(57) ABSTRACT

In some embodiments, a method includes receiving an input from a participant of a collaborative session among two or more devices, wherein the input is to cause a capture of at least part of data that is part of the state of the collaborative session at a point in time. The method also includes saving a state of the collaborative session at the point in time, wherein the state is saved into an editable format. The saving includes capturing the at least part of the data that is part of the collaborative session. The saving also includes storing the data in the editable format into a machine-readable medium.

22 Claims, 6 Drawing Sheets

(56) References Cited

U.S. PATENT DOCUMENTS

| | | | |
|---|---|---|---|
| 7,421,069 B2 | 9/2008 | Vernon et al. | |
| 7,437,408 B2* | 10/2008 | Schwartz et al. | 709/204 |
| 7,590,941 B2 | 9/2009 | Wee et al. | |
| 7,634,533 B2 | 12/2009 | Rudolph et al. | |
| 7,945,622 B1 | 5/2011 | Pegg | |
| 7,966,397 B2* | 6/2011 | Dong et al. | 709/224 |
| 2002/0194219 A1* | 12/2002 | Bradley et al. | 707/506 |
| 2003/0195791 A1* | 10/2003 | Waller et al. | 705/10 |
| 2003/0208541 A1 | 11/2003 | Musa | |
| 2004/0006548 A1* | 1/2004 | Mahmood | 707/1 |
| 2004/0107256 A1 | 6/2004 | Odenwald et al. | |
| 2004/0107270 A1 | 6/2004 | Stephens et al. | |
| 2004/0111639 A1* | 6/2004 | Schwartz et al. | 713/201 |
| 2004/0133647 A1 | 7/2004 | Ozkan et al. | |
| 2004/0181577 A1 | 9/2004 | Skurikhin et al. | |
| 2004/0189700 A1* | 9/2004 | Mandavilli et al. | 345/751 |
| 2004/0205452 A1* | 10/2004 | Fitzsimons et al. | 715/500 |
| 2004/0240642 A1* | 12/2004 | Crandell et al. | 379/88.22 |
| 2004/0267871 A1* | 12/2004 | Pratley et al. | 709/200 |
| 2005/0010607 A1* | 1/2005 | Parker et al. | 707/200 |
| 2005/0055321 A1* | 3/2005 | Fratkina et al. | 706/45 |
| 2005/0066037 A1* | 3/2005 | Song et al. | 709/227 |
| 2005/0071440 A1 | 3/2005 | Jones et al. | |
| 2005/0198006 A1 | 9/2005 | Boicey et al. | |
| 2005/0210105 A1 | 9/2005 | Hirata et al. | |
| 2006/0026251 A1* | 2/2006 | Cheng et al. | 709/207 |
| 2006/0026502 A1* | 2/2006 | Dutta | 715/511 |
| 2006/0143043 A1 | 6/2006 | McCallie, Jr. et al. | |
| 2006/0167662 A1 | 7/2006 | Yu et al. | |
| 2006/0171515 A1 | 8/2006 | Hintermeister et al. | |
| 2006/0173959 A1 | 8/2006 | McKelvie et al. | |
| 2006/0200374 A1* | 9/2006 | Nelken | 705/9 |
| 2006/0200520 A1 | 9/2006 | Vernon et al. | |
| 2006/0204213 A1 | 9/2006 | Slone | |
| 2006/0279627 A1 | 12/2006 | Yamamoto et al. | |
| 2006/0279628 A1 | 12/2006 | Fleming | |
| 2007/0050448 A1* | 3/2007 | Gonen et al. | 709/204 |
| 2007/0061296 A1* | 3/2007 | Burke et al. | 707/3 |
| 2007/0078821 A1* | 4/2007 | Kubo et al. | 707/3 |
| 2007/0081522 A1 | 4/2007 | Apelbaum | |
| 2007/0118794 A1 | 5/2007 | Hollander et al. | |
| 2007/0143149 A1* | 6/2007 | Buttner et al. | 705/3 |
| 2007/0174334 A1* | 7/2007 | Inoue et al. | 707/104.1 |
| 2007/0186157 A1 | 8/2007 | Walker et al. | |
| 2007/0192410 A1 | 8/2007 | Liversidge et al. | |
| 2008/0005244 A1 | 1/2008 | Vernon et al. | |
| 2008/0077665 A1* | 3/2008 | Sekaran et al. | 709/204 |
| 2008/0077666 A1* | 3/2008 | Sekaran et al. | 709/204 |
| 2008/0130525 A1 | 6/2008 | Jansen et al. | |
| 2008/0172607 A1* | 7/2008 | Baer | 715/255 |
| 2008/0189365 A1* | 8/2008 | Narayanaswami et al. | 709/204 |
| 2008/0229037 A1* | 9/2008 | Bunte et al. | 711/162 |
| 2008/0288580 A1 | 11/2008 | Wang et al. | |
| 2008/0320081 A1 | 12/2008 | Biswas et al. | |
| 2009/0049129 A1 | 2/2009 | Faisal et al. | |
| 2009/0089379 A1 | 4/2009 | Pegg | |
| 2009/0099827 A1 | 4/2009 | Georgis et al. | |
| 2009/0204906 A1 | 8/2009 | Irving | |
| 2014/0029919 A1 | 1/2014 | Codavalli et al. | |
| 2014/0032771 A1 | 1/2014 | Pegg et al. | |
| 2014/0033073 A1 | 1/2014 | Pegg | |

FOREIGN PATENT DOCUMENTS

| | | |
|---|---|---|
| JP | 2005341015 A | 12/2005 |
| WO | WO-2009042416 A1 | 4/2009 |

OTHER PUBLICATIONS

"Video Conferencing: P2P Solution From VSee Launches New Free Full Collaboration Version", [Online]. Retrieved from the Internet: <URL:http://www.masternewmedia.org/news/2007/03/05/video_conferencing_p2p_solution_from.htm>, (May 5, 2007), 18 pgs.

"U.S. Appl. No. 11/863,100, Non-Final Office Action mailed Jun. 11, 2010", 21 pgs.

"U.S. Appl. No. 11/863,100, Response filed Oct. 12, 2010 to Non-Final Office Action mailed Jun. 11, 2010", 12 pgs.

"U.S. Appl. No. 12/243,819, Final Office Action mailed Oct. 27, 2010", 9 pgs.

"U.S. Appl. No. 12/243,819, Non-Final Office Action mailed May 17, 2010", 9 pgs.

"U.S. Appl. No. 12/243,819, Response filed Aug. 17, 2010 to Non-Final Office Action mailed May 17, 2010", 10 pgs.

"International Application Serial No. PCT/US2008/076034, International Search Report and Written Opinion mailed Mar. 6, 2009", 12 pgs.

Chabert, A., et al., "Java Object-Sharing in Habanero", Communications of the Association for Computing Machinery vol. 41 (6), (Jun. 1, 1998), 69-76.

Handley, et al., "Session Initiation Protocol", RFC 2543: IETF, (Mar. 1999), 1-153.

Lukasz, B., et al., "TANGO—a Collaborative Environment for the World-Wide Web", Northeast Parallel Architectures Center, Syracuse University, URL:http://citeseerx.ist.psu.edu/viewdoc/summary?doi=10.1.1.52.768.

Morrison, D., et al., "Lotus Sametime Application Development Guide", Internet Citation, URL:http://www.redbooks.ibm.com/redbooks/pdfs/sg245651.pdf, (May 2000).

"U.S. Appl. No. 11/863,100, Advisory Action mailed Oct. 27, 2011", 3 pgs.

"U.S. Appl. No. 11/863,100, Final Office Action mailed Jun. 9, 2011", 14 pgs.

"U.S. Appl. No. 11/863,100, Response filed Oct. 11, 2011 to Final Office Action mailed Jun. 9, 2011", 6 pgs.

"U.S. Appl. No. 11/932,074, Final Office Action mailed Nov. 14, 2011", 13 pgs.

"U.S. Appl. No. 11/932,074, Response filed Aug. 11, 2011 to Non-Final Office Action mailed May 12, 2011", 12 pgs.

"U.S. Appl. No. 12/243,808, Final Office Action mailed Jun. 13, 2011", 10 pgs.

"U.S. Appl. No. 12/243,808, Response filed Dec. 12, 2011 to Final Office Action mailed Jun. 13, 2011", 7 pgs.

"U.S. Appl. No. 11/863,100, Non-Final Office Action mailed Dec. 22, 2010", 17 pgs.

"U.S. Appl. No. 11/863,100, Response filed Mar. 22, 2011 to Non-Final Office Action mailed Dec. 22, 2010", 9 pgs.

"U.S. Appl. No. 11/932,074, Non-Final Office Action mailed May 12, 2011", 13 pgs.

"U.S. Appl. No. 12/243,808, Non-Final Office Action mailed Dec. 30, 2010", 11 pgs.

"U.S. Appl. No. 12/243,808, Response filed Mar. 30, 2011 to Non-Final Office Action mailed Dec. 30, 2010", 7 pgs.

"U.S. Appl. No. 12/243,819, Notice of Allowance mailed Mar. 8, 2011", 8 pgs.

"U.S. Appl. No. 12/243,819, Response filed Jan. 27, 2011 to Final Office Action mailed Oct. 27, 2010", 9 pgs.

"U.S. Appl. No. 11/932,074, Response filed Jul. 5, 2012 to Non Final Office Action mailed Apr. 5, 2012", 12 pgs.

"U.S. Appl. No. 11/932,074, Examiner's Answer mailed Feb. 15, 2013", 13 pgs.

"U.S. Appl. No. 11/932,074, Final Office Action mailed Aug. 30, 2012", 14 pgs.

"U.S. Appl. No. 11/932,074, Non Final Office Action mailed Apr. 5, 2012", 15 pgs.

"U.S. Appl. No. 11/932,074, Pre-Appeal Brief Request for Review filed Nov. 1, 2012", 5 pgs.

"U.S. Appl. No. 11/932,074, Response filed Feb. 14, 2012 to Final Office Action mailed Nov. 14, 2011", 10 pgs.

"U.S. Appl. No. 12/243,808, Examiner Interview Summary mailed Jan. 14, 2014", 3 pgs.

"U.S. Appl. No. 12/243,808, Non Final Office Action mailed Oct. 8, 2013", 10 pgs.

Final Office Action dated Dec. 2, 2014 in U.S. Appl. No. 11/863,100, 15 pages.

Notice of Allowance dated Jun. 26, 2015 in U.S. Appl. No. 11/863,100, 7 pages.

Final Office Action dated Nov. 14, 2011 in U.S. Appl. No. 11/932,074, 14 pages.

(56) References Cited

OTHER PUBLICATIONS

Non-Final Office Action dated Aug. 20, 2010 in U.S. Appl. No. 12/269,736, 13 pages.
Final Office Action dated Jan. 28, 2011 in U.S. Appl. No. 12/269,736, 12 pages.
Non-Final Office Action dated Sep. 29, 2011 n U.S. Appl. No. 12/269,736, 12 pages.
Final Office Action dated Mar. 27, 2012 in U.S. Appl. No. 12/269,736, 12 pages.
Non-Final Office Action dated Jul. 9, 2014 in U.S. Appl. No. 11/863,100, 15 pages.

* cited by examiner

SAVING STATE OF A COLLABORATIVE SESSION IN AN EDITABLE FORMAT

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright® 2007, Adobe Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Meetings among a number of participants may be held as collaborative sessions in an on-line meeting. In particular, applications now offer the ability for participants to connect across the Internet to share voice, video and data in real time for meetings, presentations, training, etc.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
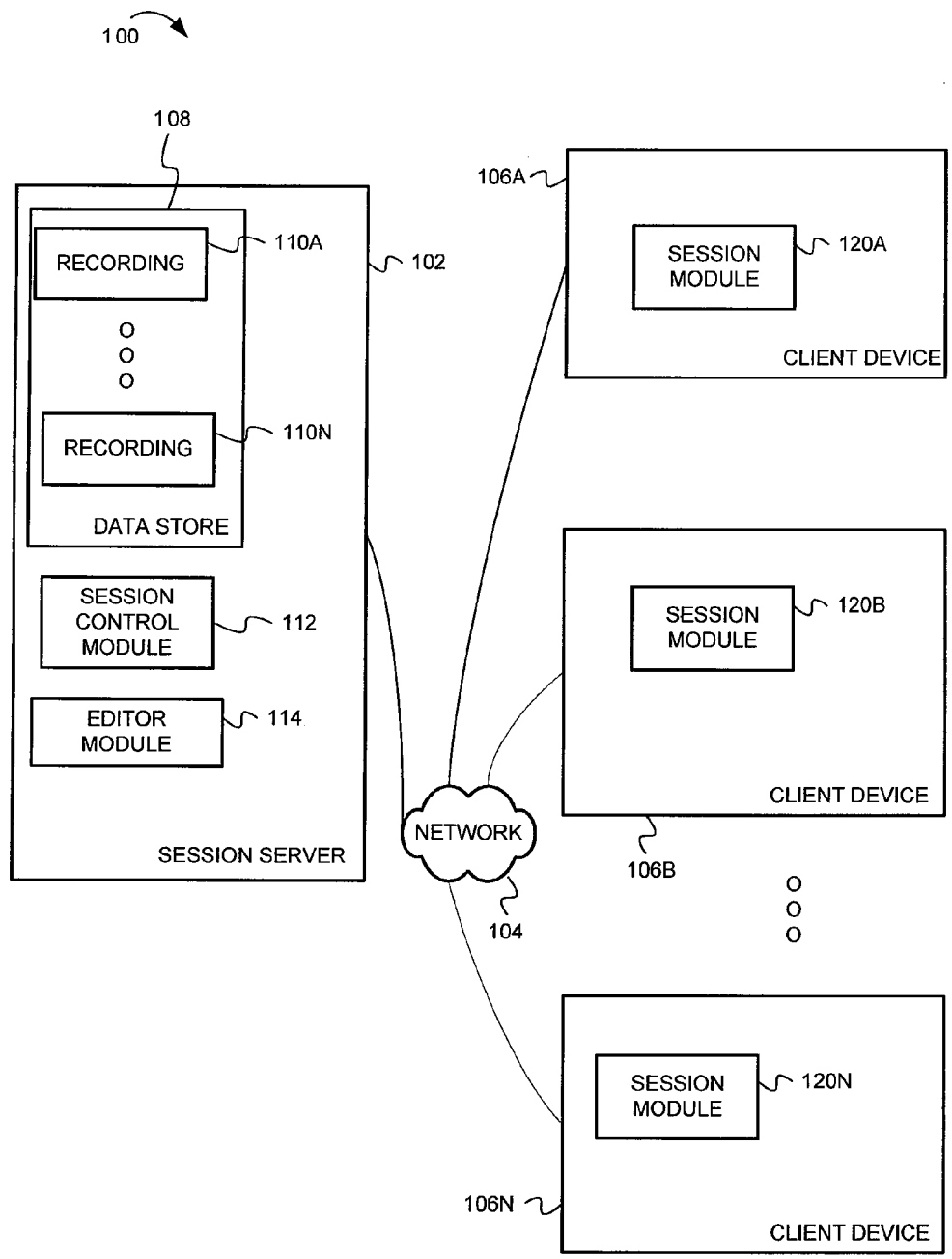
FIG. 1 is a network diagram of a system for saving a state of a collaborative session in an editable format, according to example embodiments.

Methods, apparatus and systems for saving a state of a collaborative session in an editable format are described. In the following description, numerous specific details are set forth. However, it is understood that embodiments of the invention may be practiced without these specific details. In other instances, structures and techniques have not been shown in detail in order not to obscure the understanding of this description.

As used herein, the term "collaborative session" may comprise any type of sharing of multimedia data among two or more participants. For example, the collaborative session may be sharing of multimedia data among multiple participants using client devices that are coupled together over a network. An example of a collaborative session may comprise any type of online meeting. For example, the collaborative session may be an electronic presentation by one or more persons that is shared over a network other person(s). The electronic presentation may comprise various types of multimedia. Examples of the type of data that may be part of a collaborative session may be audio, video, slide presentations, a shared white board, display of polling results, chat log, a window that displays the participants, etc.

As used herein, an editable format may enable subsequent edits of the data. An example of a document that comprises an editable format may be a page description language document, such as a document encoded in the Portable Document Format ("PDF") which may be viewed and modified in one of the ADOBE® ACROBAT® programs available from ADOBE SYSTEMS INCORPORATED. An editable-formatted document may also be an electronic word processing file, spreadsheet file, markup language file, slide-show type presentation file, text file, or other file type which may be modified.

As used herein, the term "client device" refers to any type of device that may execute a software application. The client device may be a thin client, fat client, or a hybrid client. For example, client devices may include desktop computer, notebook computers, wireless/wired devices, mobile devices (such as cellular telephones, Personal Digital Assistants (PDAs)), media players (such as MP-3 devices), gaming consoles, set-top boxes, etc.

Example embodiments may be used in conjunction with a collaborative session. Certain data (e.g., data on a white board, data on a note pad, etc.) that is being exchanged in a collaborative session may be dynamic. Example embodiments enable a participant of a collaborative session to save the state of the session at a particular instance in time. In some embodiments, the state is saved in an editable format. For example, the state of the session may be saved in an editable document (such as a PDF file). Accordingly, example embodiments would allow the capturing of a snapshot of the session, not just on a pixel-by-pixel level, but also by category or semantics. In particular, in example embodiments, the snapshot is not a screenshot capture of pixels on a screen of the collaborative session. Rather, the snapshot comprises editable data. Example embodiments may store various parts of the collaborative session at any given time. In some embodiments, multiple snapshots of a given session may be stored in one or more editable documents by one or more participants of the session.

For example, drawings on a shared white board may be stored in an editable document. Therefore, if a workflow were drawn on the white board, the individual shapes and the text therein may be published into the editable document. Subsequently, the workflow may be modified. For example, an individual shape may be removed, the text within a shape may be edited, shapes may be added thereto, etc.

In some embodiments, data stored in the editable document may or may not be part of the viewable data seen by some or all of the participants of the collaborative session. For example, data regarding the participants of the session may be stored in the editable document. During the collaborative session, the names of the participants may be viewed. Data regarding the participants that is not viewed on all participants' screens may include their email addresses, telephone numbers, etc. For example, such data may be viewable by only the administrator of the collaborative session. Even though not viewable by all participants, this non-viewable data may still be transmitted to the devices that are part of the collaborative session. In some embodiments, both viewable and non-viewable data may be stored in the editable document. Alternatively, only viewable or only non-viewable data may be stored therein.

FIG. 1 is a network diagram of a system for saving a state of a collaborative session in an editable format, according to example embodiments. A system 100 comprises a session server 102 and client devices 106A, 106B and 106N that are couple together through a network 104.

The session server 102 comprises a session control module 112, an editor module 114 and a data store 108. The data store 108 may store the recordings 110A-110N of the collaborative sessions. The session control module 112 may control the collaborative sessions. For example, participants at the client devices 106 may be part of an on-line meeting that includes sharing of data, video, audio, etc. As further described below, the collaborative sessions may be a series of events or collaboration components. The session control module 112 may receive and forward these events among the different client devices 106 during the actual collaborative session.

The client devices 106A, 106B and 106N include session modules 120A, 120B and 120N, respectively. The session modules 120 may receive input that is received as part of a collaborative session and forward such input as an event to the session control module 112 on the session server 102. The session control module 112 may then forward such an event to the other client devices 106 that are part of the collaborative session. For example, after a user enters the collaborative session, an event is generated that includes an update to the window that displays the users that are part of the collaborative session. In another example, if a user adds an entry into the chat log, the entry is recorded as an event, which includes the data that the user entered into the chat log. In another example, if a user updates a white board, the pixel changes are recorded as an event. These different events may be communicated as data over the network to the different client devices that are part of the collaborative session.

As further described below, a participant may input a request to capture the state of a collaborative session at one or more instances of time within the collaborative session. The session module 120 may receive the input and perform the capture of the state of the collaborative session. In some embodiments, the state is saved in an editable format. Accordingly, the data can subsequently be edited by the participants, other persons, modules, etc. In some embodiments, the participant may select from any number of templates for saving the state of the collaborative session. Such templates determine what data is saved as part of the state as well as the format of the data. Moreover, the session module 120 may store the saved state in a machine-readable medium (e.g., the data store 108), output the saved state to the participants or other persons for their review or edits, etc. For example, the saved state(s) may be stored along with the recordings 110 of the collaborative session.

The system 100 may comprise any number of client devices 106. While described such that the recordings, the saved states, the session control module 112 and the editor module 114 are in a same server, embodiments are not so limited. Alternatively or in addition, such recordings, saved states and modules may be distributed across any number of network storage devices/servers. In some embodiments, operations may be executed in a peer-to-peer architecture. Accordingly, the session control module 112, the editor module 114 and the storage of the recordings and saved states may be within one or more client devices.

The network communication may be any combination of wired and wireless communication. In some embodiments, the network communication may be based on one or more communication protocols (e.g., HyperText Transfer Protocol (HTTP), HTTP Secured (HTTPS), Real Time Messaging Protocol (RTMP), Real Time Messaging Protocol Secured/SSL (RTMPS) etc.). While the system 100 shown in FIG. 1 employs a client-server architecture, embodiments are not limited to such an architecture, and could equally well find application in a distributed, or peer-to-peer, architecture system. The session control module 112, the editor module 114 and the session modules 120 may be software, hardware, firmware or a combination thereof for executing operations, according to some embodiments.

Figure 2:
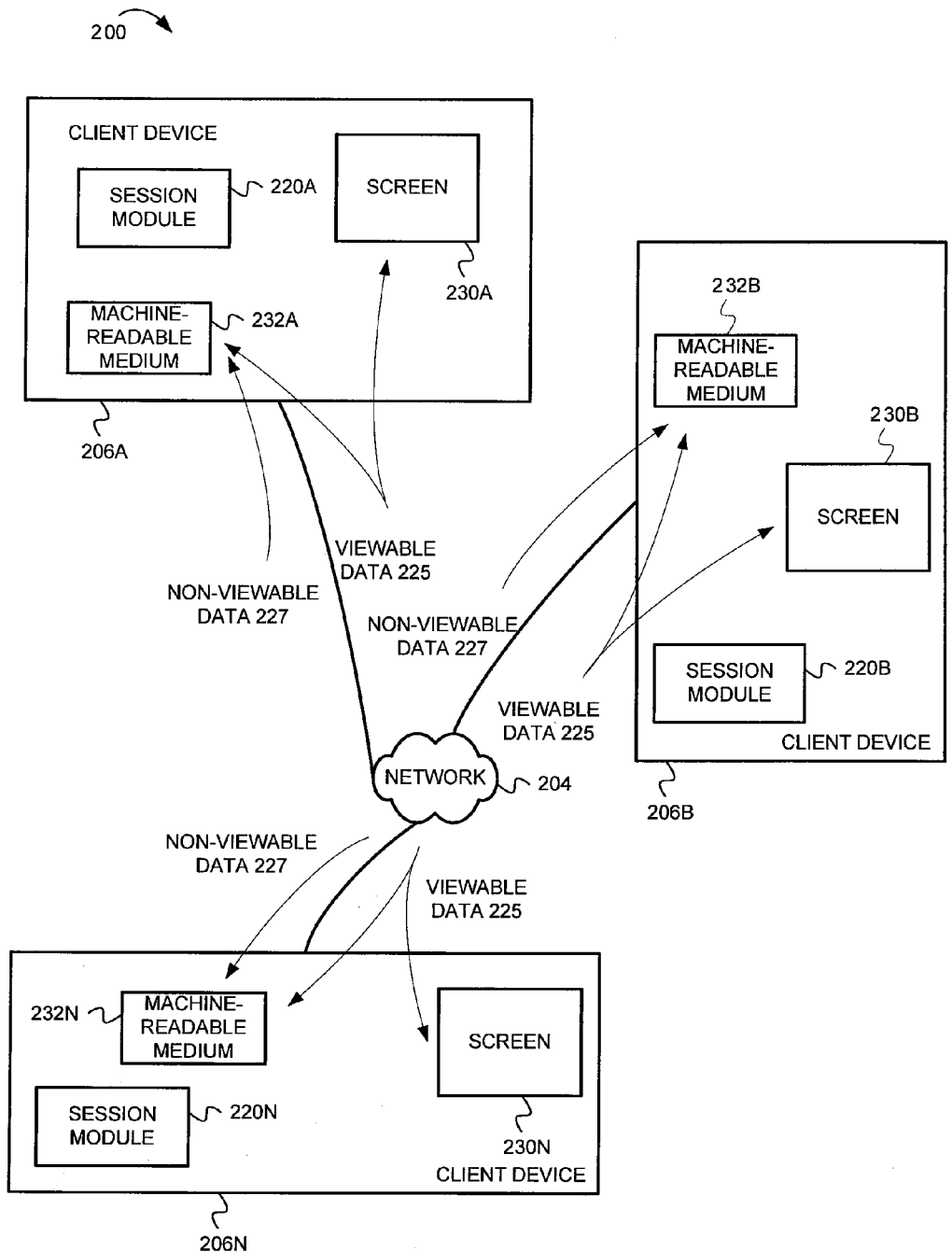
FIG. 2 is a more detailed network diagram of a system for saving a state of a collaborative session in an editable format that illustrates data communications, according to example embodiments.

FIG. 2 is a more detailed network diagram of a system for saving a state of a collaborative session in an editable format that illustrates data communications, according to example embodiments. A system 200 of FIG. 2 illustrates data communications among the client devices of FIG. 1 during a collaborative session. The system 200 comprises client devices 206A, 206B and 206N that are couple together through a network 204.

The client devices 206A, 206B and 206N include session modules 220A, 220B and 220N, respectively. As described above in the description of FIG. 1, the session modules 220 may receive input that is received as part of a collaborative session and forward such input as an event to the session control module 112 on the session server 102. In example embodiments, the client devices 206A, 206B and 206N also include screens 230A, 230B and 230N, respectively. The screens 230 may be any type of display used to display data that is part of the collaborative session. Examples of the screens 230 may be any type of display device, such as Liquid Crystal Displays (LCDs), Cathode Ray Tubes (CRTs), plasma display panels, etc. In example embodiments, the client devices 206A, 206B and 206N include machine-readable medium 232A, 232B and 232N, respectively. The machine-readable medium 232 includes any mechanism which provides (i.e., stores and/or transmits) information in a form accessible by a machine (e.g., a computer, a network device, a personal digital assistant, manufacturing tool, any device with a set of one or more processors, etc.). In example embodiments, the machine-readable medium 232 includes volatile and/or non-volatile media (e.g., read only memory (ROM), random access memory (RAM), magnetic disk storage media, optical storage media, flash memory devices, etc.).

As shown, various types of communications may be transmitted to the client devices 206 as part of the collaborative session. In example embodiments, the communications includes viewable data 225 and non-viewable data 227. The viewable data 225 are stored in the machine-readable medium 232 and displayed on the screen 230. The non-viewable data 227 are stored in the machine-readable medium 232 and not displayed on the screen 230. The viewable data 225 may comprise any type of data that is displayed on the screen 230. For example, the viewable data 225 may include names of the participants of the collaborative session that are displayed in an attendee list, data displayed on a notes pad or white board of the collaborative session. Different examples of data being displayed on the screens 230 are described in more detail below. The non-viewable data 227 may comprise any type of data that is part of the collaborative session but is not displayed on the screen 230. For example, the non-viewable data 227 may include additional data about the participants. Such data may include the phone number, e-mail address, street address, etc.

In example embodiments, the non-viewable data 227 may not be viewable on a screen 230 of any participant. Alternatively, some or all of the non-viewable data 227 may be viewed on the screens 230 of certain participants and not on the screens 230 of other participants. For example, the administrator of collaborative session may be able to view the non-viewable data 227, while other participants are not able to view the non-viewable data 227. As further described below, in some embodiments, the viewable data 225 and the non-viewable data 227 are used to create the snapshot of the collaborative session.

In some embodiments, the viewable data 225 and the non-viewable data 227 may be transmitted as part of an event occurring in the collaborative session. The session control module 112 may then forward such an event to the other client devices 106 that are part of the collaborative session. For example, after a user enters the collaborative session, an event is generated that includes an update to the window that displays the users that are part of the collaborative session. In another example, if a user adds an entry into the chat log, the entry is recorded as an event, which includes the data that the user entered into the chat log. In another example, if a user updates a white board or notes, the pixel changes are recorded as an event.

Figure 3:
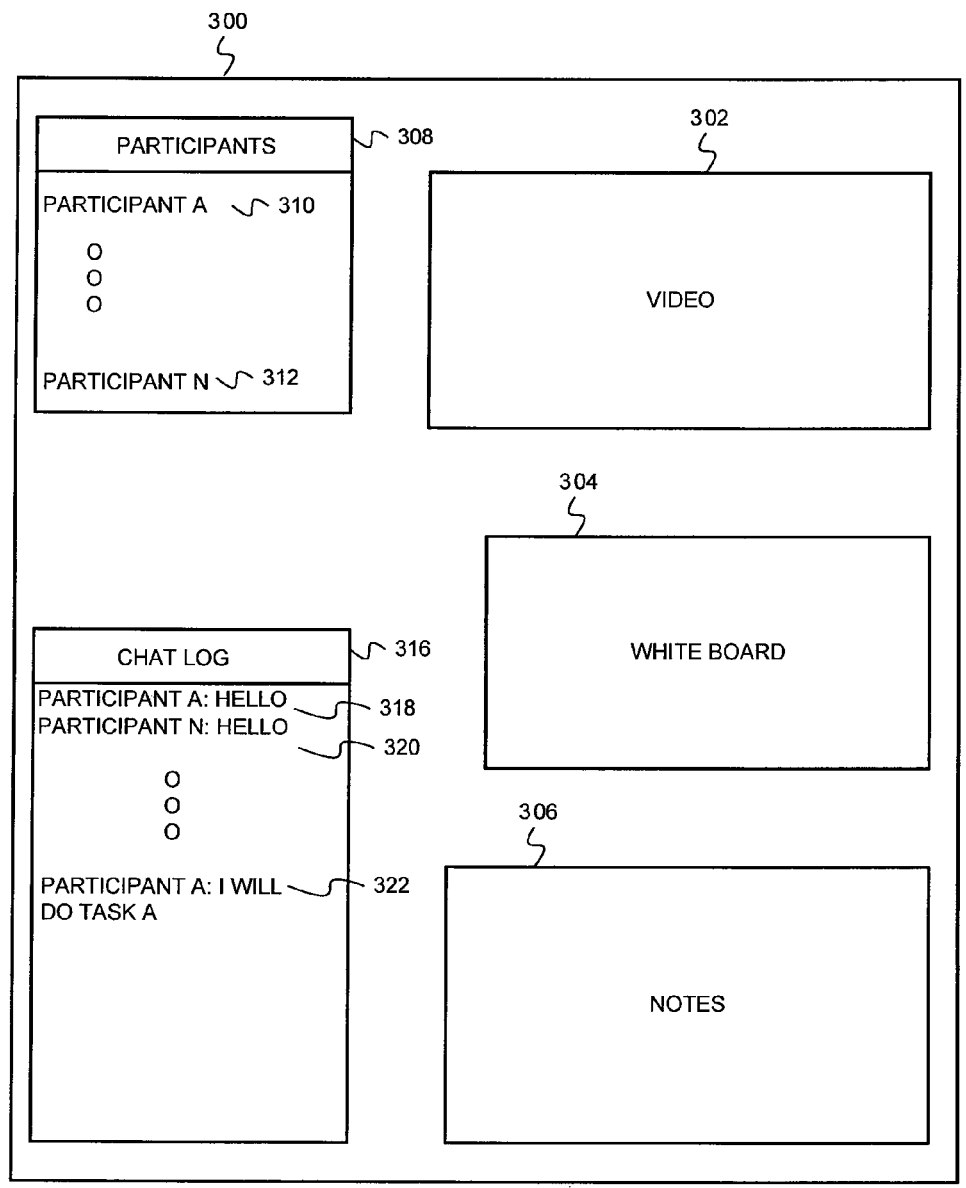
FIG. 3 is a screen shot of a Graphical User Interface (GUI) of a collaborative session, according to example embodiments.

FIG. 3 is a screen shot of a Graphical User Interface (GUI) of a collaborative session, according to example embodiments. FIG. 3 includes a screen shot 300 that includes a video window 302, a white board window 304, a notes pad window 306, a participants window 308, and a chat log window 316. The video window 302 may include streaming video of the participants, a video relevant to the collaborative session, etc. For example, the video window 302 may be segmented into a number of smaller windows for providing such video. The white board window 304 may be a shared board among the participants such that the participants may draw sketches, type in text, etc. that is shared among the participants. The notes pad window 306 may be a window that displays notes that may be inputted by participants during the collaborative session. The notes may include the agenda for the session, tasks assigned to the participants, reminders related to such tasks, etc.

The participants window 308 may include entries that include the participants of the collaborative session. After a participant logs into the collaborative session, an entry with their identification is added to the participants window 308. In this example, an entry 310 is included for participant A, an entry 312 is included for participant N, etc.

The chat log window 316 may include chat entries that are provided by the different participants through the collaborative session. As examples, the chat log window 316 includes a chat entry 318, a chat entry 320, a chat entry 322, etc.

The screen shot 300 provides examples of an output that may be part of a collaborative session. Other example embodiments may include more or less such output. For example, additional windows for other type of data presentation, user interaction, etc. may be included as part of the collaborative session.

Figure 4:
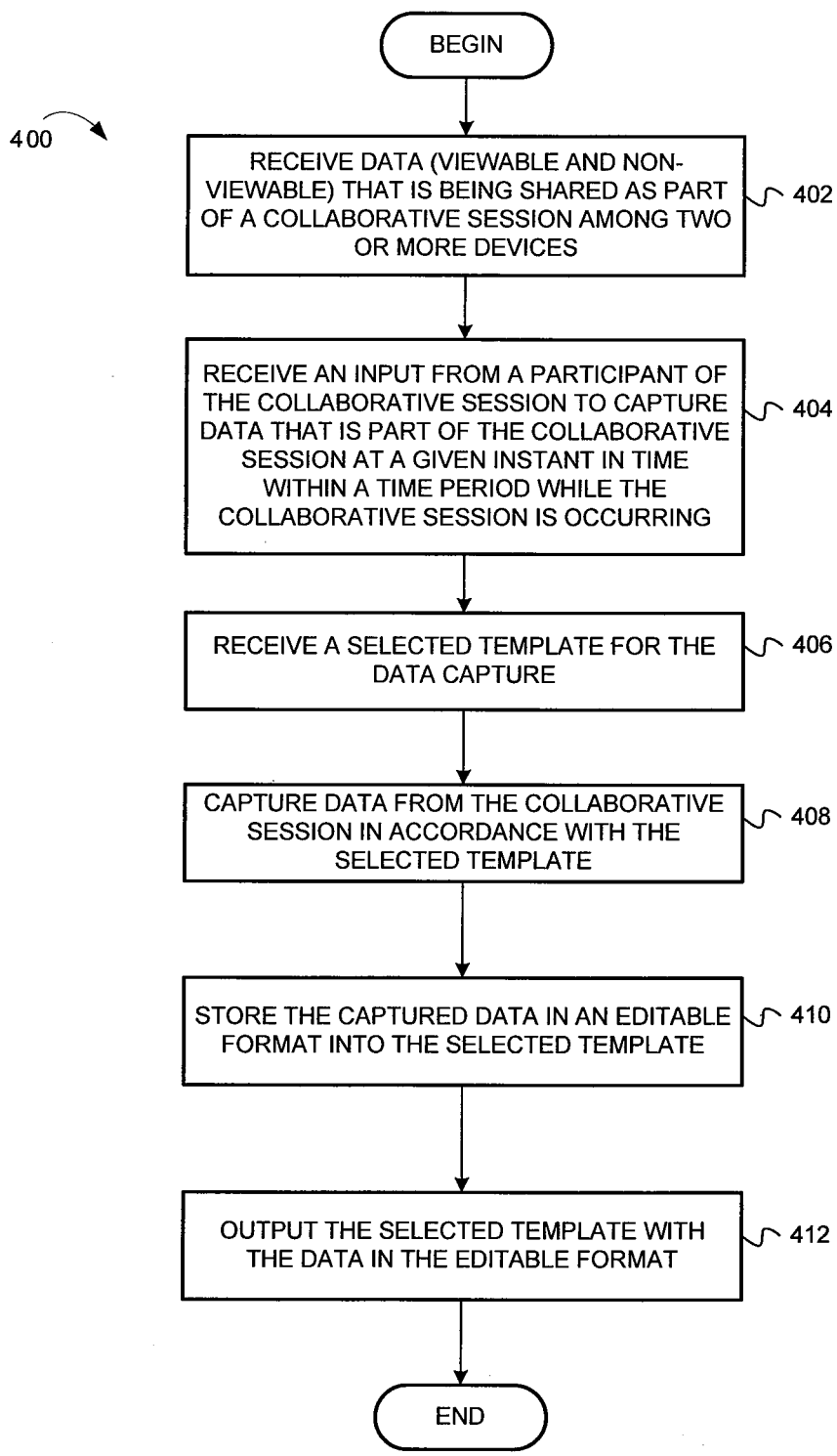
FIG. 4 is a diagram of a method for saving a state of a collaborative session at a given point in time into an editable format, according to example embodiments.

Operations, according to example embodiments, are now described. In certain embodiments, the operations are performed by instructions residing on machine-readable media (e.g., software), while in other embodiments, the methods are performed by hardware or other logic (e.g., digital logic). FIG. 4 is a diagram of a method for saving a state of a collaborative session at a given point in time into an editable format, according to example embodiments. The flow diagram 400 is described with reference to FIGS. 1-3. In some embodiments, the flow diagram 400 is performed by the session module 120/220. In example embodiments, the operations of the flow diagram 400 may occur during any point in a collaborative session. In example embodiments, the operations of the flow diagram 400 may also occur during any point during a recording of a collaborative session. The flow diagram 400 commences at block 402.

At block 402, the session module 220 receives data that is being shared as part of a collaborative session among two or more devices. With reference to FIG. 2, the session module 220 may receive the data that is exchanged among client devices 206. For example, a participant on a different client device may edit the data in the white board window 304. Such edits may be transmitted to the session modules 220 of the other client devices 206 that are part of the collaborative session. In some embodiments, the session module 220 may also receive data from the session server 102. The session control module 112 in the session server 102 may transmit data regarding the collaborative session that is not exchanged among the client devices 206. For example, the session control module 112 may transmit data regarding the participants after the participants enter the collaborative session. Examples of such data may include an email address, phone number, etc. of the participant. In some embodiments, the session module 220 receives viewable data 225 and non-viewable data 227 that is being shared as part of the collaborative session. Accordingly, in some embodiments, only a portion of the data being received is displayed on the screen 230. As further described below, in some embodiments, both viewable data and non-viewable data may be captured as part of the state of the collaborative session. The flow continues at block 404.

At block 404, the session module 220 receives an input from a participant of the collaborative session to cause capture of data that is part of the collaborative session at a given instant of time within a time period while the collaborative session is occurring. In example embodiments, any participant may input the request to capture the state of the collaborative session. This input may be received at any point during the collaborative session. In example embodiments, the session module 220 on the client device 206 to receive the input is the module to process such request (as further described below). The flow continues at block 406.

At block 406, the session module 220 receives a selected template for the data capture. In particular, in some embodiments, the participant that requests the snap shot of the data of the collaborative session may also select a template into which the data is captured. In some embodiments, one to any number of templates may be used for storage of the data. The template used for storage of the data may determine which parts of the collaborative session are captured and the format of the captured data.

Figure 5:
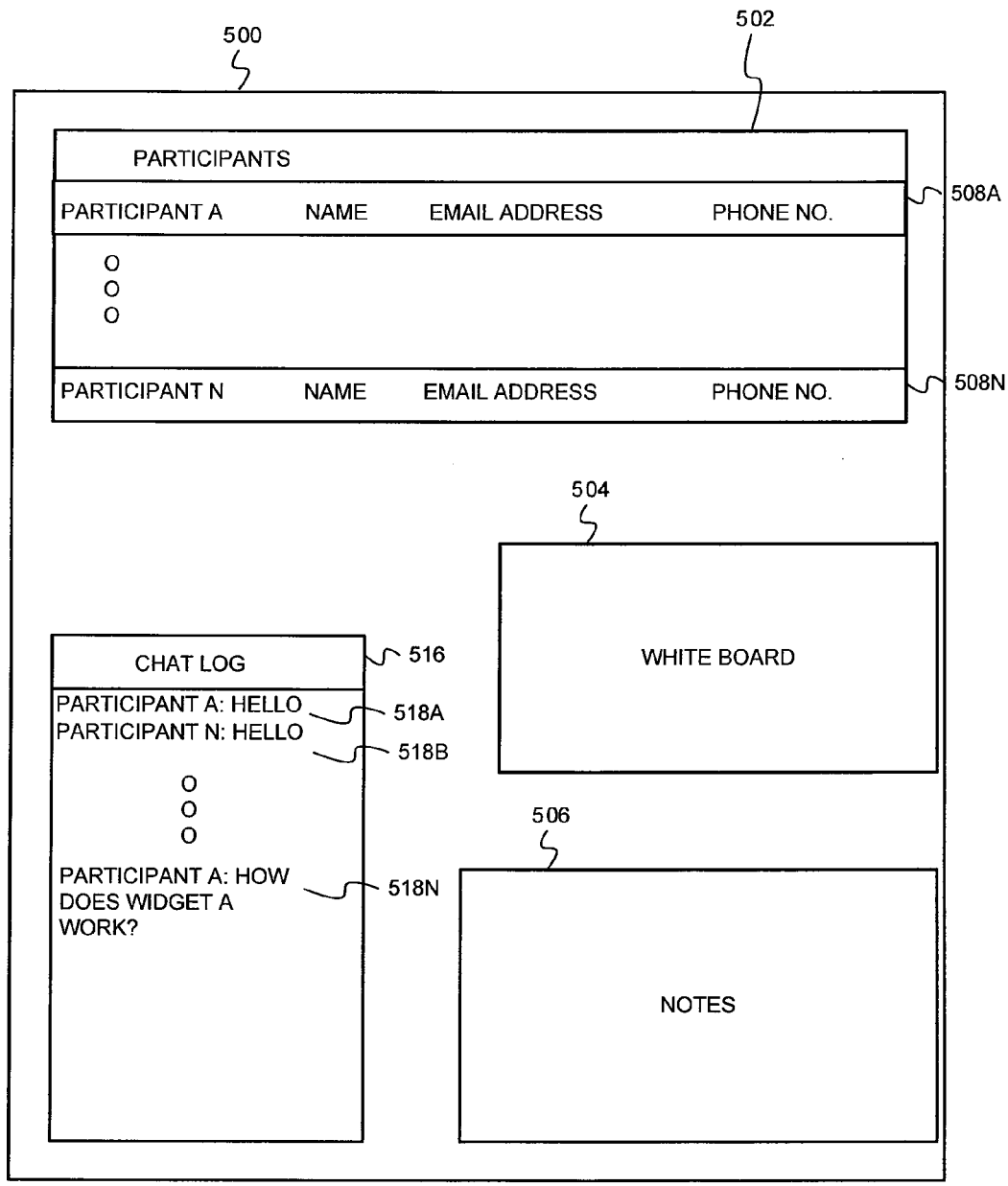
FIG. 5 is output, into a template, that is a result of saving the state of a collaborative session into an editable format, according to example embodiments.

To illustrate, FIG. 5 is output, into a template, that is a result of saving the state of a collaborative session into an editable format, according to example embodiments. FIG. 5 illustrates a template 500. The template 500 includes participants data 502. The participants data 502 include an entry for each of the participants of the collaborative session (entries 508A-508N). As shown, the entries 508 include a name, email address and phone number for the participants. In some embodiments, the name may be viewable data 225, while the email address and phone number may be non-viewable data 227. Therefore, while a part of the data for a participant is viewable during the collaborative session, additional data may be included in the snapshot that is part of the template. The template 500 also includes data from a white board 504 and data from the notes 506. The template 500 includes data from a chat log 516, which includes a number of entries

518A-518N. Therefore, data for participants that are part of the collaborative session at the given point in time are stored in the template 500. Further, data from the white board, the notes and the chat log at the given point in time are also stored in the template 500.

FIG. 5 illustrates one example of a template. Embodiments are not so limited. For example, another template may capture data regarding the participants and the white board, while a different template may capture data regarding the white board and the notes. Also, the format of the data may be different for a given template. For example, only the name and phone number of a participant is provided in one template, while only the name and email address of a participant is provided in a different template. Returning to the flow diagram 400, the flow continues at block 408.

At block 408, the session module 220 captures data from the collaborative session for a given instant of time of the collaborative session in accordance with the selected template. With reference to FIG. 2, the session module 220 may capture the data (at least in part) from the data that is exchanged among the client devices 206 during the collaborative session (the viewable data 225 and the non-viewable data 227). The session module 220 may only capture the data that is needed to complete the selected template. This data may also be received as a result of an event in the collaborative session. This data may be received for another client device, the session server, etc. The flow continues at block 410.

At block 410, the session module 220 stores the captured data in an editable format into the selected template. In some embodiments, the session module 220 stores the data into a document (such as a PDF document, word processor-based documents) such that the data may be edited therein. The session module 220 may store the data into the selected template. Thus, in some embodiments, the session module 220 does not capture a pixel-by-pixel snap shot of the screen. Rather, the session module 220 is storing data (that is exchanged among the client devices 206 during the collaborative session) into a format that may subsequently be edited. The flow continues at block 412.

At block 412, the session module 220 outputs the selected template with the captured data in the editable format. In some embodiments, the session module 220 may output the completed selected template to various locations, store the data in a machine-readable medium, etc. For example, the session module 220 may output the completed selected template to all the participants of the collaborative session (e.g., via email), to selected participants and non-participants, etc. Alternatively or in addition, the session module 220 may store the completed selected template in a machine-readable medium. For example, in some embodiments, the session module 220 may store a copy of the completed selected template on a machine-readable medium in the data store 108 in the session server 102. Accordingly, the various snap shots of the collaborative session may be stored with the recordings of the collaborative session (shown in FIG. 1). The operations of the flow diagram 400 are complete.

While described such that the state of the collaborative session is saved based on input from a participant, in some embodiments, the state may be saved at one or more points of the session independent of such participant input. For example, the state may be saved every 15 minutes, every 30 minutes, at the halfway point of the collaborative session, at the end of the collaborative session, etc.

Figure 6:
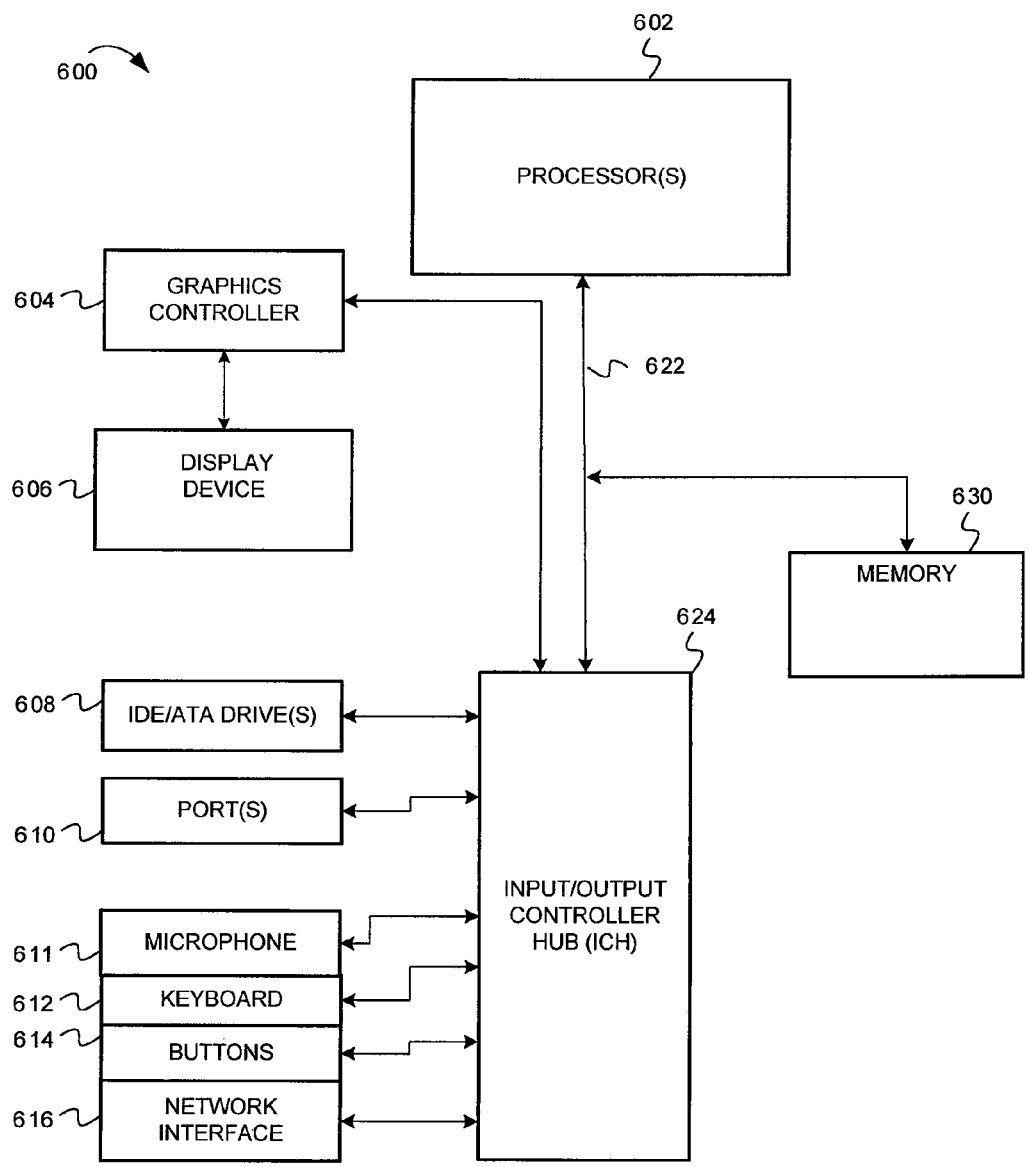
FIG. 6 illustrates a computer that may be used for versioning of modifiable electronic documents, according to example embodiments.

A detailed block diagram of an example computer environment, according to some embodiments, is now described. In particular, FIG. 6 illustrates a computer that may be used for saving a state of a collaborative session in an editable format, according to example embodiments. A computer system 600 may be representative of one of the client devices, the servers, etc.

As illustrated in FIG. 6, the computer system 600 comprises processor(s) 602. The computer system 600 also includes a memory unit 630, processor bus 622, and Input/Output controller hub (ICH) 624. The processor(s) 602, memory unit 630, and ICH 624 are coupled to the processor bus 622. The processor(s) 602 may comprise any suitable processor architecture. The computer system 600 may comprise one, two, three, or more processors, any of which may execute a set of instructions in accordance with embodiments of the invention.

The memory unit 630 may store data and/or instructions, and may comprise any suitable memory, such as a dynamic random access memory (DRAM). The computer system 600 also includes IDE drive(s) 608 and/or other suitable storage devices. A graphics controller 604 controls the display of information on a display device 606, according to some embodiments of the invention.

The input/output controller hub (ICH) 624 provides an interface to I/O devices or peripheral components for the computer system 600. The ICH 624 may comprise any suitable interface controller to provide for any suitable communication link to the processor(s) 602, memory unit 630 and/or to any suitable device or component in communication with the ICH 624. For one embodiment of the invention, the ICH 624 provides suitable arbitration and buffering for each interface.

For some embodiments of the invention, the ICH 624 provides an interface to one or more suitable integrated drive electronics (IDE) drives 608, such as a hard disk drive (HDD) or compact disc read only memory (CD ROM) drive, or to suitable universal serial bus (USB) devices through one or more USB ports 610. For one embodiment, the ICH 624 also provides an interface to a keyboard 612, a mouse 614, a CD-ROM drive 618, one or more suitable devices through one or more Firewire ports 616. For one embodiment of the invention, the ICH 624 also provides a network interface 620 though which the computer system 600 can communicate with other computers and/or devices.

In some embodiments, the computer system 600 includes a machine-readable medium that stores a set of instructions (e.g., software) embodying any one, or all, of the methodologies for described herein. Furthermore, software may reside, completely or at least partially, within memory unit 630 and/ or within the processor(s) 602.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method performed by a computer comprising a processor and a memory, the method comprising:
receiving an input from a participant of participants of a collaborative session among two or more devices, the input being a request by the participant to capture data that is part of a state of the collaborative session in a snapshot of a given instance of time of the collaborative session while the collaborative session is occurring, the collaborative session comprising windows, each of the windows corresponding to a respective type of data presentation that is output to the participants during the collaborative session;
receiving a template selected by the participant for the capture of the data, the template determining which parts of the collaborative session the data is captured from and a format of the data to be captured, one of the parts being output using a first type of data presentation in a first window of the windows and another of the parts being output using a second type of data presentation in a second window of the windows, the data including user identifying information about one or more participants of the collaborative session, the user identifying information being unviewable in the collaborative session by at least one of the participants; and
saving the snapshot of the given instance of time of the collaborative session into a document having editable format, the saving comprising:
performing the capture of the data into the template as the snapshot; and
storing the snapshot, including the user identifying information, in the document having the editable format on machine-readable medium, the editable format allowing participants of the collaborative session to subsequently edit the data stored in the document, the document being stored with at least another document comprising another snapshot of a different instance of time of the collaborative session than the given instance of time.

2. The method of claim 1, further comprising receiving data that is being shared as part of the collaborative session among two or more devices, wherein the data that is captured is based on the data that is being shared as part of the collaborative session.

3. The method of claim 1, further comprising transmitting the data stored in the editable format to at least one participant of the collaborative session.

4. The method of claim 1, wherein the first window is a white board window and the second window is a participants window that includes characteristics of participants of the collaborative session.

5. The method of claim 1, wherein the parts correspond to a subset of the windows displayed during the collaborative session.

6. The method of claim 1, wherein the data is not viewable by at least one participant of the collaborative session.

7. The method of claim 1, wherein capturing the data is independent of capturing pixels on a screen being used by the participant for the collaborative session.

8. The method of claim 1, wherein receiving the input from the participant comprises receiving a selection of the template.

9. The method of claim 1, wherein the first snapshot does not include any data corresponding to output to a third window of the windows.

10. A non-transitory machine-readable medium including instructions which when executed by a machine causes the machine to perform operations comprising:
receiving data that is being shared as part of a collaborative session among two or more devices, the collaborative session being viewable by participants using the two or more devices, the data comprising non-viewable data that is viewable in the collaborative session only by one or more administrators of the collaborative session;
receiving an input from a participant of the collaborative session, the input being a request by the participant to capture the data that is part of the state of the collaborative session in a snapshot of a given instance of time of the collaborative session while the collaborative session is occurring, the collaborative session comprising windows, each window corresponding to a respective type of data presentation that is output to the participants during the collaborative session, the data that is part of the state of the collaborative session including the non-viewable data comprising user identifying information about at least one of the participants of the collaborative session, the input comprising a selection of a template into which the data is to be stored, the template selected by the participant for the capture of the data, the template determining which parts of the collaborative session the data is captured from and a format of the data to be captured, one of the parts being output using a first type of data presentation in a first window of the windows and another of the parts being output using a second type of data presentation in a second window of the windows; and saving the snapshot of the given instance of time of the collaborative session into a document having an editable format, the saving comprising performing the capture of the data into the template as the snapshot and storing the snapshot, including the user identifying information, on at least one of the machine-readable medium or a different machine-readable medium to create the document, the editable format allowing participants of the collaborative session to subsequently edit the data stored in the document, the document being stored with at least another document comprising another snapshot of a different instance of time of the collaborative session than the given instance of time.

11. The non-transitory machine-readable medium of claim 10, wherein capturing of the data is independent of capturing pixels on the screen being used by the participant for the collaborative session.

12. The non-transitory machine-readable medium of claim 10, further comprising transmitting the data stored in the editable format to participants of the collaborative session.

13. The non-transitory machine-readable medium of claim 10, wherein the data comprises at least one of data from a white board, data from a note pad, or data that includes characteristics of participants of the collaborative session.

14. An apparatus comprising:
a machine-readable medium;
a session module to receive data that is being shared as part of a collaborative session with one or more other apparatuses, the session module to save the data in a snapshot of a given instance of time of the collaborative session while the collaborative session is occurring in response to a request by a participant of the collaborative session to capture a state of the collaborative session in the snapshot of the given instance of time of the collaborative session, the collaborative session comprising windows, each of the windows corresponding to a respective type of data presentation that is output to the participants during the collaborative session, the data including an email address, phone number, or street address of one or more participants of the collaborative session that is unviewable in the collaborative session by at least one of the participants, the session module to receive a template selected by the participant for the capture of the data, the template determining which parts of the collaborative session the data is captured from and a format of the data to be captured, one of the parts being output using a first type of data presentation in a first window of the windows and another of the parts being output using a second type of data presentation in a second window of the windows, and save the snapshot of the given instance of time, including the email address, phone number, or street address in a document having an editable format on the machine-readable medium, the editable format allowing participants of the collaborative session to subsequently edit the data stored in the document; and
a display screen to display at least a subset of the data that is being shared as part of the collaborative session, the email address, phone number, or street address not being included in the subset of the data being displayed.

15. The apparatus of claim 14, wherein the data of the collaborative session comprises at least one of data from a white board, data from a note pad, or data that includes characteristics of participants of the collaborative session.

16. The apparatus of claim 14, wherein the parts correspond to a subset of the windows displayed during the collaborative session.

17. The apparatus of claim 14, wherein the data that is saved in the editable format is independent of a capture of pixels of a screen shot.

18. The apparatus of claim 14, wherein at least part of the data is derived from data that is being shared as part of the collaborative session and is not viewable on the display screen.

19. A method performed by a computer comprising a processor and a memory, the method comprising:
receiving a first input from a participant of participants of a collaborative session among two or more devices, the first input being a first request by the participant to capture first data that is part of a first state of the collaborative session in a first snapshot of a first particular instance of time of the collaborative session while the collaborative session is occurring, the collaborative session comprising windows, each of the windows corresponding to a respective type of data presentation that is output to the participants during the collaborative session;
responsive to the receiving of the first request:
receiving a first template selected by the participant for the capture of the first data, the first template determining which parts of the collaborative session the first data is captured from and a format of the first data to be captured, one of the parts being output using a first type of data presentation in a first window of the windows and another of the parts being output using a second type of data presentation in a second window of the windows; and
causing the first snapshot of the first particular instance of time of the collaborative session to be captured into the first template as the first snapshot and stored into a first editable document;
receiving a second input from the participant, the second input being a second request by the participant to capture second data that is part of a second state of the collaborative session in a second snapshot of a second particular instance of time of the collaborative session while the collaborative session is occurring;
responsive to the receiving of the second request:
receiving a second template selected by the participant for the capture of the second data, the second template determining which parts of the collaborative session the second data is captured from and a format of the second data to be captured, one of the parts being output using the first type of data presentation in the first window of the windows and another of the parts being output using a third type of data presentation in a third window of the windows that is not captured in the first snapshot; and
causing the second snapshot of the second particular instance of time of the collaborative session to be captured into the second template as the second snapshot and stored into a second editable document, the second editable document being stored with the first editable document.

20. The method of claim 19, wherein the collaborative session comprises a chat log window that displays a chat log comprising chat entries provided by a plurality of the participants during the collaborative session, the first snapshot having first chat log entries from the chat log at the first particular instance of time that are saved into the first editable document, the second snapshot having second chat log entries from the chat log at the second particular instance of time that are saved into the second editable document.

21. The method of claim 19, wherein the first editable document and the second editable document are stored in a data store along with a recording of the collaborative session.

22. The method of claim 19, wherein the first editable document and the second editable document are stored on a client device of the participant.

* * * * *